United States Patent
Umimoto et al.

(10) Patent No.: US 9,487,875 B2
(45) Date of Patent: Nov. 8, 2016

(54) PRODUCING ELECTROLYZED LIQUID

(71) Applicant: Osaka Electro-Communication University, Neyagawa-shi, Osaka (JP)

(72) Inventors: Koichi Umimoto, Osaka (JP); Shunji Nagata, Osaka (JP)

(73) Assignee: OSAKA ELECTRO-COMMUNICATION UNIVERSITY, Neyagawa (JP)

( * ) Notice: Subject to any disclaimer, the term of this patent is extended or adjusted under 35 U.S.C. 154(b) by 0 days.

(21) Appl. No.: 14/110,743

(22) PCT Filed: Dec. 27, 2012

(86) PCT No.: PCT/JP2012/008363
§ 371 (c)(1),
(2) Date: Oct. 9, 2013

(87) PCT Pub. No.: WO2014/102865
PCT Pub. Date: Jul. 3, 2014

(65) Prior Publication Data
US 2014/0183056 A1    Jul. 3, 2014

(51) Int. Cl.
| C25B 9/00 | (2006.01) |
| C25B 1/26 | (2006.01) |
| C02F 1/467 | (2006.01) |

(Continued)

(52) U.S. Cl.
CPC ............. *C25B 15/08* (2013.01); *C02F 1/4674* (2013.01); *C25B 1/26* (2013.01); *C25B 9/06* (2013.01); *C02F 1/4618* (2013.01); *C02F 1/46104* (2013.01); *C02F 2001/46133* (2013.01); *C02F 2001/46171* (2013.01);

(Continued)

(58) Field of Classification Search
CPC .................. C02F 1/4618; C02F 1/461; C02F 2001/46171; C02F 2201/003; C02F 2001/46152; C02F 1/463; C25B 1/34
See application file for complete search history.

(56) References Cited

U.S. PATENT DOCUMENTS 3,972,794 A   8/1976  Lamm
4,761,208 A   8/1988  Gram et al.
(Continued)

FOREIGN PATENT DOCUMENTS

CN   101759252 A  *  6/2010
JP   61-101296 A     5/1986
(Continued)

OTHER PUBLICATIONS

Microfilm of the specification and drawings annexed to the written application of Japanese Utility Model Application No. 046223/1988 (Laid-open No. 150942/1989) (Tokyo Electric Power Company, Inc., Mitsubishi Heavy Industries, Ltd.) Fig. 9 (no Family), Oct. 18, 1989.

(Continued)

*Primary Examiner* — Steven A. Friday
(74) *Attorney, Agent, or Firm* — Maschoff Brennan

(57) ABSTRACT

An electrolyzer device comprises a container configured to receive liquid to be electrolyzed; an anode arranged in the container and operatively connected to a power supply; a cathode arranged in the container so as to surround at least a portion of the anode and operatively connected to the power supply; a first pipe in liquid connection with the container, the first pipe including an intake port arranged in the vicinity of the cathode relative to the anode; and a second pipe in liquid connection with the container.

20 Claims, 5 Drawing Sheets

(51) Int. Cl.
*C25B 15/08* (2006.01)
*C25B 9/06* (2006.01)
*C02F 1/461* (2006.01)

(52) U.S. Cl.
CPC .. *C02F 2209/005* (2013.01); *C02F 2209/008* (2013.01); *C02F 2209/06* (2013.01); *Y10T 29/49002* (2015.01)

(56) References Cited

U.S. PATENT DOCUMENTS

| | | | |
|---|---|---|---|
| 5,753,100 A * | 5/1998 | Lumsden | C02F 1/4606 204/272 |
| 7,186,323 B2 | 3/2007 | Hara | |
| 8,173,006 B2 | 5/2012 | Umimoto et al. | |
| 2005/0126928 A1 | 6/2005 | Hung et al. | |
| 2005/0189237 A1* | 9/2005 | Sano | 205/746 |
| 2007/0108064 A1 | 5/2007 | Buckley et al. | |
| 2007/0151865 A1* | 7/2007 | Shimko et al. | 205/628 |
| 2007/0187263 A1 | 8/2007 | Field et al. | |
| 2009/0007152 A1 | 1/2009 | Cahill et al. | |
| 2009/0008263 A1 | 1/2009 | Achiwa | |
| 2011/0025306 A1* | 2/2011 | Ackermann | C02F 1/46109 324/204 |
| 2011/0036779 A1* | 2/2011 | Bias | B03D 1/1418 210/703 |
| 2013/0011749 A1 | 1/2013 | Mita et al. | |

FOREIGN PATENT DOCUMENTS

| | | |
|---|---|---|
| JP | 06-190365 A | 7/1994 |
| JP | 07-031976 A | 2/1995 |
| JP | 08-132040 A | 5/1996 |
| JP | 08229565 A | 9/1996 |
| JP | 09-033479 A | 2/1997 |
| JP | 0970581 A | 3/1997 |
| JP | 09262584 A | 10/1997 |
| JP | 10314738 A | 12/1998 |
| JP | 11169856 A | 6/1999 |
| JP | 11-350177 A | 12/1999 |
| JP | 11350117 A | 12/1999 |
| JP | 2000-070947 A | 3/2000 |
| JP | 2000-167556 A | 6/2000 |
| JP | 2000254647 A | 9/2000 |
| JP | 2001246383 A | 9/2001 |
| JP | 2003062574 A | 3/2003 |
| JP | 2003-236546 A | 8/2003 |
| JP | 2004188300 A | 7/2004 |
| JP | 2011-016065 A | 1/2011 |
| JP | 2011-230076 A | 11/2011 |
| KR | 10-2006-0029669 A * | 4/2006 |
| WO | 2009067213 A2 | 5/2009 |
| WO | 2014034329 A1 | 3/2014 |
| WO | 2014114806 A1 | 7/2014 |

OTHER PUBLICATIONS

Microfilm of the specification and drawings annexed to the written application of Japanese Utility Model Application No. 161357/1979 (Laid-open No. 080293/1981) (TDK Co. Ltd.), Claims, Fig. 1 (no Family) Jun. 6, 1981.

International Search Report dated Apr. 17, 2013 in application No. PCT/JP2012/008363.

"Apia 60," accessed at https://web.archive.org/web/20080927190457/http://www.hokuty.co.jp/apia60111.html, accessed on Jan. 29, 2015, p. 1 (Machine Translation).

"PURESTER," accessed at https://web.archive.org/web/20121128143520/http://www.morinagamilk.co.jp/products/purester/product, accessed on Jan. 29, 2015, pp. 3 (Machine Translation).

Abadias, M., et al., "Efficacy of neutral electrolyzed water (NEW) for reducing microbial contamination on minimally-processed vegetables," International Journal of Food Microbiology, vol. 123, Issue 1-2, pp. 151-158 (Mar. 31, 2008).

International Search Report and Written Opinion for International Application No. PCT/JP2013/001271, mailed on May 28, 2013.

Umimoto, K., et al., "Development of automatic controller for providing multi electrolyzed water," World congress on Medical Physics and Biomedical Engineering, vol. 25, No. 7, pp. 306-309 (Sep. 7-12, 2009).

* cited by examiner

PRODUCING ELECTROLYZED LIQUID

CROSS-REFERENCE TO RELATED APPLICATION

This application is the U.S. National Stage filing under 35 U.S.C. §371 of PCT Application No. PCT/JP2012/008363 filed on Dec. 27, 2012.

TECHNICAL FIELD

The present disclosure relates to a device and method for producing electrolyzed liquid or electrolytes.

BACKGROUND

Electrolysis is well known as being a method of separating an ionic substance, that is either molten or dissolved in a suitable solution, by way of a chemical reaction. A device for achieving electrolysis may require certain components, such as an electrolyte containing an ionic substance, a pair of electrodes (i.e., an anode and a cathode), and a direct electric current supply to drive chemical reactions at the electrodes. As one example, an electrolyzer device may include a container that retains an electrolyte such as a salt solution (i.e., water solving sodium chloride serving as an electrolysis aid), as well as an anode and a cathode arranged in the container. In the electrolysis process, the salt solution is electrolyzed by chemical reactions, resulting in the production of strongly acidic electrolyzed water (SAEW) at the anode and strongly alkaline electrolyzed water at the cathode. The resulting SAEW contains an available chlorine (AC) such as hypochlorous acid (HClO), which is known to have a strong sterilizing/cleansing action, and which thus enables the killing of various microorganisms such as viruses and bacteria. Further, by way of blending the SAEW and the strongly alkaline electrolyzed water, electrolyzed water having a pH in the physiologically neutral range (i.e., weakly acidic, slightly acidic, neutral) can be obtained. Water having such a neutral pH may be suitable for biological use.

SUMMARY

The embodiment of the electrolyzer device disclosed herein comprises a container configured to receive liquid to be electrolyzed; an anode arranged in the container and operatively connected to a power supply; a cathode arranged in the container so as to surround at least a portion of the anode and operatively connected to the power supply; a first pipe in liquid connection with the container, the first pipe including an intake port arranged in the vicinity of the cathode relative to the anode; and a second pipe in liquid connection with the container.

In the electrolyzer device thus constituted, the strongly acidic electrolyzed liquid is produced at the anode and the strongly alkaline electrolyzed liquid is produced at the cathode arranged in the container so as to surround at least a portion of the cathode. The strongly alkaline electrolyzed liquid produced at the cathode is discharged from the intake port of the first pipe, which is arranged in the vicinity of the cathode relative to the anode, to the outside of the container through the first pipe. As a result, the pH of the electrolyzed liquid remaining in the container is inclined to be low (toward the acidic side), whereby the electrolyzed liquid having a pH in the range between strong acidity and neutrality is produced in the container. The electrolyzed liquid thus obtained can be easily extracted from the container with the second pipe.

DESCRIPTION OF EMBODIMENTS

Figure 1:
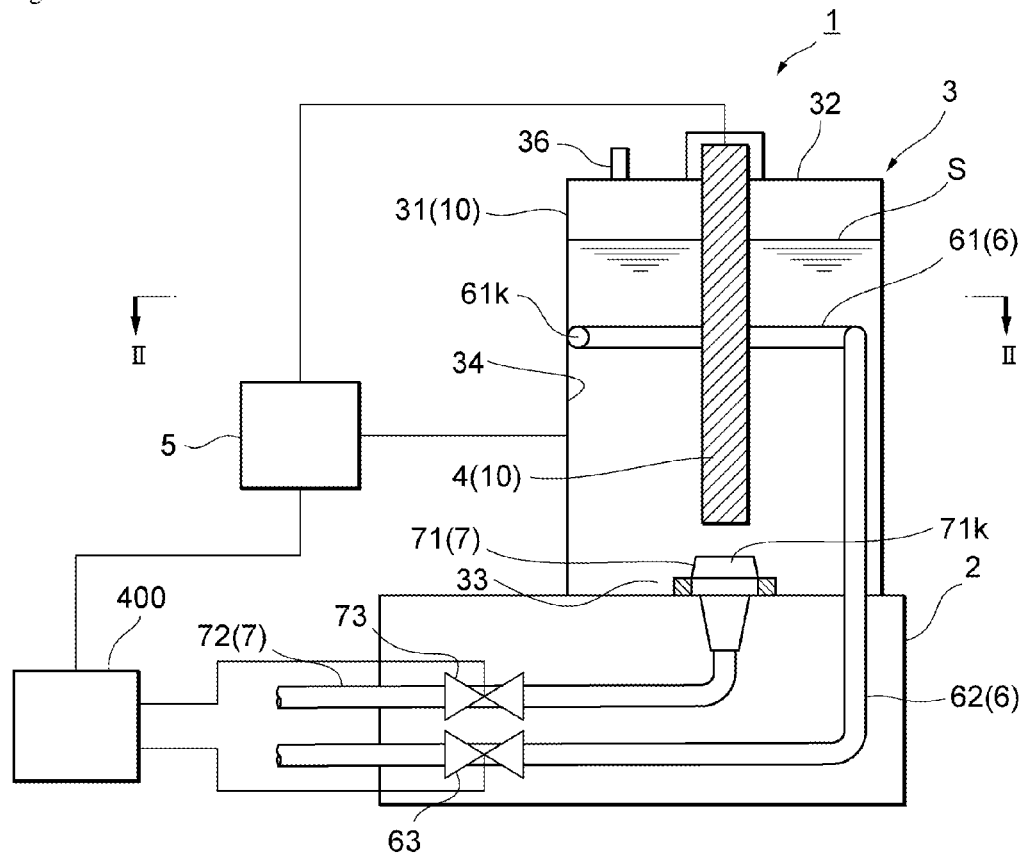
FIG. 1 is a schematic sectional view showing an example of an electrolyzer device arranged in accordance with the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure describes techniques, devices, apparatuses, systems, and methods for electrolysis including, but not limited to: electrolyzing a liquid in a container by providing energy to a cathode and an anode, arranged in a the container, such energy being necessary to cause chemical reactions at the cathode and the anode; obtaining alkaline electrolyzed liquid in the vicinity of the cathode relative to the anode; and obtaining acidic or substantially-neutral electrolyzed liquid in the vicinity of the anode relative to the cathode.

Figure 2:
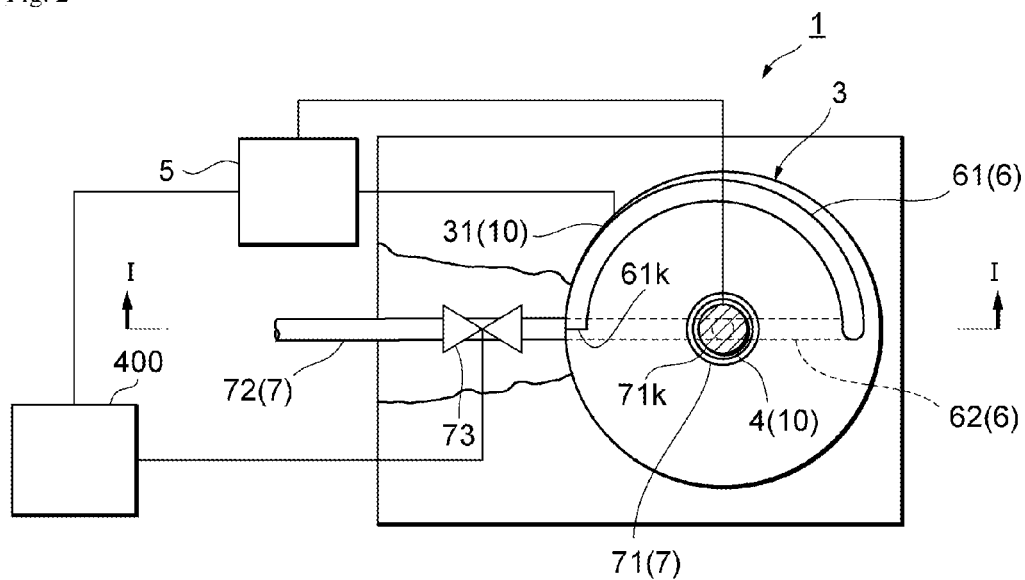
FIG. 2 is a schematic sectional view taken along the line II-II of FIG. 1.

FIGS. 1 and 2 are schematic sectional views showing a non-limiting example of an electrolyzer device arranged in accordance with the present disclosure. The electrolyzer device may be used to produce electrolyzed water having a pH in the physiologically neutral range (i.e., weakly acidic, slightly acidic, neutral) by way of electrolyzing a dilute salt solution S, which may be referred to herein as "liquid to be electrolyzed".

It should be noted that the term "electrolyzed water" as used herein, is a general term for aqueous solutions obtained by providing direct electric current to, for example, tap water and a dilute salt solution in a container through a cathode and an anode. Various types of electrolyzed water may be produced depending on the difference in the electrolyzer and electrolysis system. For example, such electrolyzed waters may be defined in accordance with pH and/or available chlorine (AC) concentration.

Generally, the strongly acidic electrolyzed water (SAEW) may have a large positive "oxidation-reduction potential" (ORP) value, which may represent strong oxidizing power. Further, "available chlorine (AC) concentration" may refer to the total concentration of chlorine contained in free chlorine and binding-form chlorine, and may represent the concentration of chlorine effectively involved in sterilization.

Referring now to FIGS. 1 and 2, an electrolyzer device 1 may include a container 3 arranged on a support base 2. The container 3 may be an electrolysis cell in, for example, a cylindrical shape having a sidewall 31. The sidewall 31 may be made of a conductive material, such as, but not limited to, SUS. The sidewall 31 of the container 3 may be operatively connected to a DC power supply 5 so that the sidewall 31 serves as a cathode in the electrolyzer device 1. As a non-limiting example, the entire container 3 may be made of a conductive material. Alternatively, instead of the sidewall 31 being made of a conductive material, the container 3 may include an electrode plate arranged along an inner surface 34 of the container 3. The container 3 may further include a top cover 32 to seal content in the container 3. The top cover 32 may be provided with an inlet port 36 to supply a dilute salt solution S into the container 3.

Although not shown in FIGS. 1 and 2, the electrolyzer device 1 may further include a solution supply system configured to supply the salt solution S to the container 3. The solution supply system may include a reservoir configured to store the salt solution S therein. The salt solution S may be supplied through a pipe operatively connecting the reservoir and the container 3. The pipe may include a flow-rate controller configured to adjust a flow rate of the salt solution S. As a non-limiting example, the solution supply system may supply raw materials of the salt solution S (i.e., water and salt) separately to the container 3, resulting in mixed liquid in the container 3. As another non-limiting example, the raw materials may be mixed within the pipe between the reservoir and the container 3.

Further, the electrolyzer device 1 may include a rod 4 arranged in the container 3 and extending in a vertical direction (i.e., a depth direction). The shape and size in a transverse section of the rod 4 may be freely selected. As a non-limiting example, the rod 4 may be made of a conductive material such as, but not limited to, graphite. As a further non-limiting example, one end of the rod 4 may be attached to the top cover 32 of the container 3 to be positioned at substantially the center of the container 3 in the transverse section thereof. By way of this arrangement, the rod 4 may be surrounded by the sidewall 31 of the container 3 in the traverse section so that they face each other along the entire perimeter thereof, forming a pair of electrodes 10. The rod 4 may be operatively connected to the power supply 5 so that the rod 4 may serve as an anode of the electrolyzer device 1. As a further non-limiting example, the other end of the conductive rod 4 may be spaced away from a bottom of the container 3.

Further, a first pipe 6 and a second pipe 7 may be arranged to be in liquid connection with the container 3. Specifically, the first pipe 6 may include an intake port 61, which extends substantially along the internal surface 34 of the container 3 in the traverse section, and a delivery pipe 62 connected to one end of the intake port 61. As a non-limiting example, the intake port 61 may travel substantially halfway across the internal surface 34. As a result of this, the intake port 61 of the first pipe 6 may be arranged in the vicinity of the sidewall 31 of the container 3 (i.e., the cathode) relative to the rod 4 (i.e., the anode). Further, as shown in FIG. 1, a vertical position of the intake port 61 may be at substantially half of the height of the container 3, but such a vertical position of the intake port 61 should not be limited.

Figure 3:
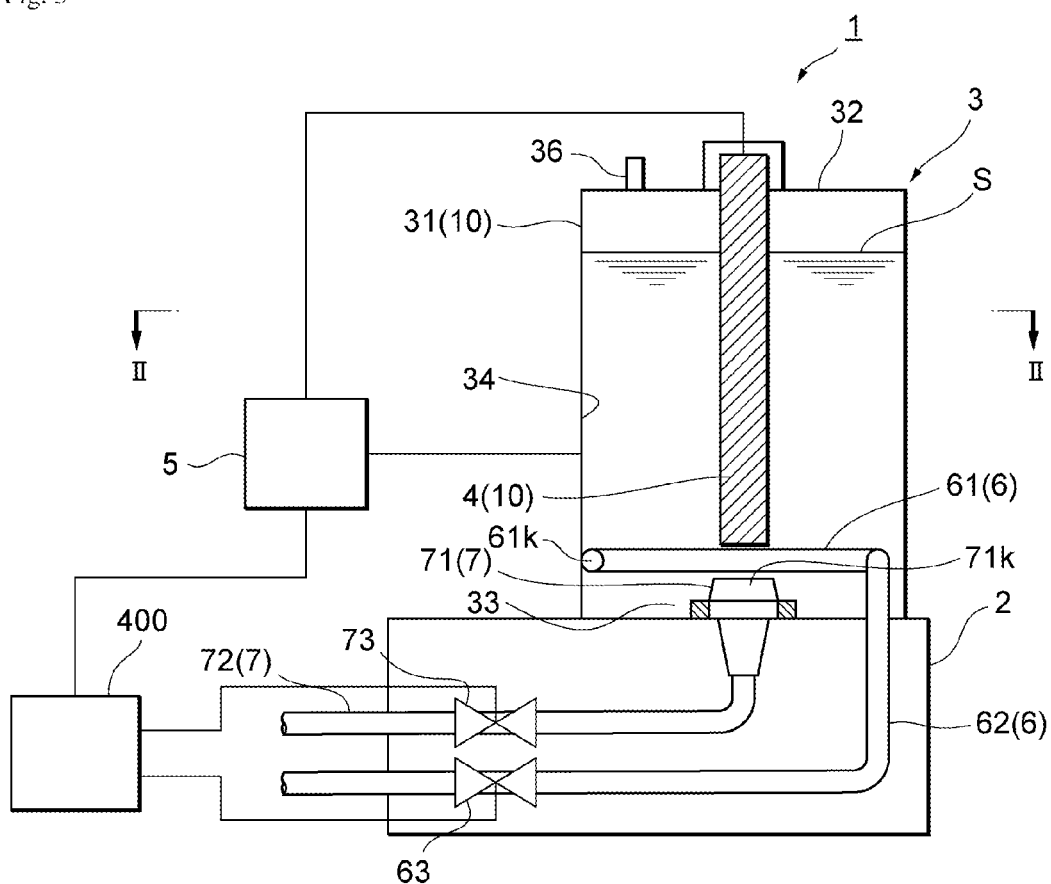
FIG. 3 is a schematic sectional view showing another example of an electrolyzer device arranged in accordance with the present disclosure.

FIG. 3 is a schematic sectional view showing another example of an electrolyzer device arranged in accordance with the present disclosure. Referring to FIG. 3, as another non-limiting example, the intake port 61 may be positioned at a lower portion of the container 3. Alternatively, the intake port 61 may be positioned at an upper portion of the container 3.

The delivery pipe 62 may include a portion extending downward along the internal surface 34 of the container 3. The delivery pipe 62 may pass through the support base 2 so as to deliver the salt solution S electrolyzed from the intake port 61 to the outside of the electrolyzer device 1. The first pipe 6 may include an on-off valve 63, such as, but not limited to, a solenoid valve, to control a flow of the salt solution S electrolyzed.

The second pipe 7 may also include an intake port 71 arranged in the vicinity of a bottom portion 33 of the container 3, and a delivery pipe 72 connected to the intake port 71. As a non-limiting example, the intake port 71 may be arranged at substantially the center of the bottom of the container 3. The delivery pipe 72 of the second pipe 7 may also pass through the support base 2 to deliver liquid from the intake port 71 to the outside of the electrolyzer device 1. The delivery pipe 72 may also be an on-off valve 73 to control a flow of the liquid.

Figure 4:
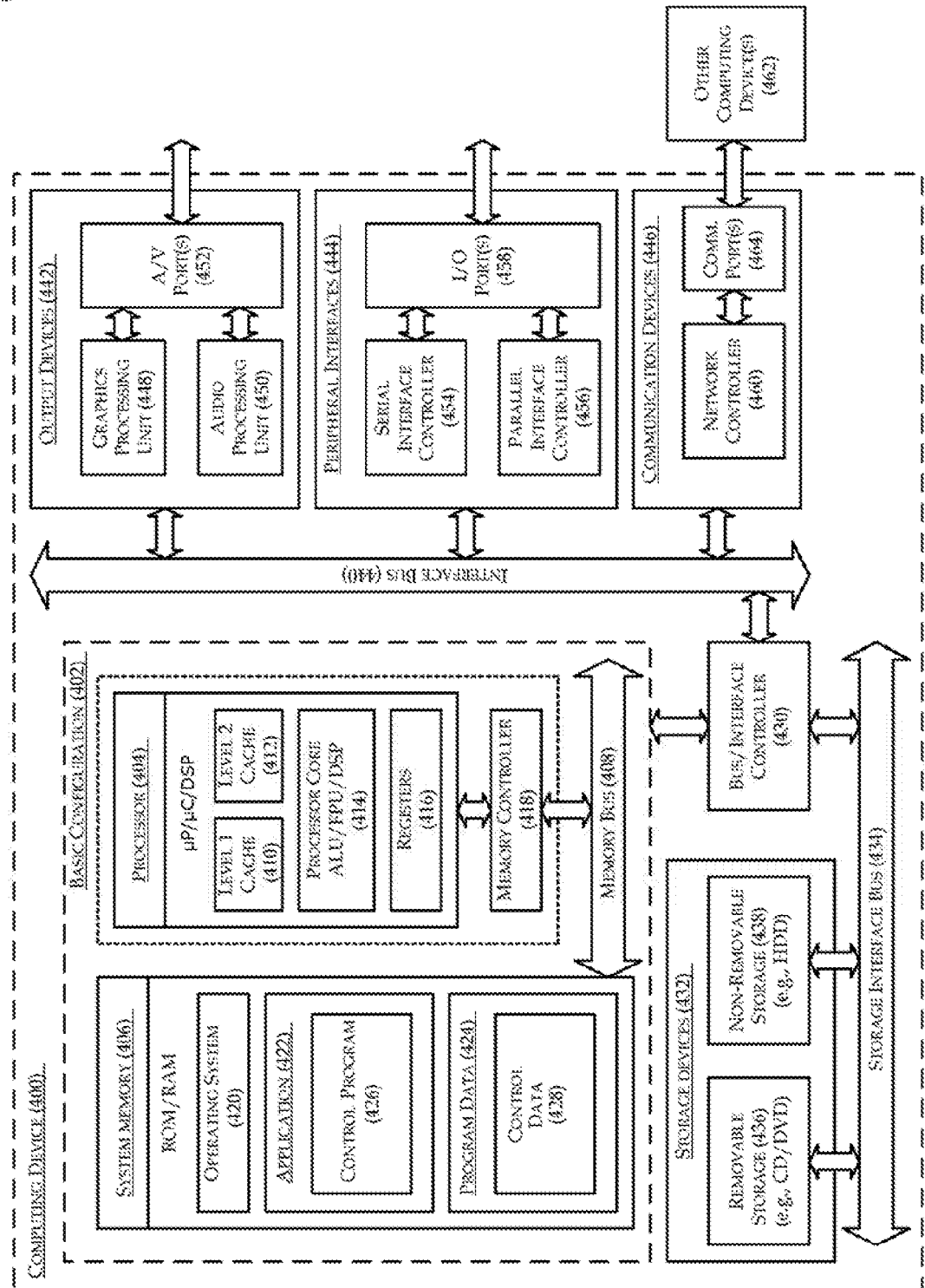
FIG. 4 is a block diagram showing an example of a computing device that is arranged for an electrolyzer device in accordance with the present disclosure.

The electrolyzer device 1 may be comprehensively controlled by a computing device. FIG. 4 is a block diagram showing an example computing device 400 that is arranged for the electrolyzer device 1 in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor(μP), a microcontroller(μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a control program 426 that is arranged to the electrolyzer device 1. The control program 426 may select, for example, a power of the power supply 5 and an amount of electrolyzed water to be discharged through the first pipe 6. Program data 424 may include control data 428 that may be useful for the electrolyzer device 1 as is described herein. In some embodiments, application 422 may be arranged to operate with program data 424 on operating system 420 such that the selected power is adjusted and maintained. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

Figure 5:
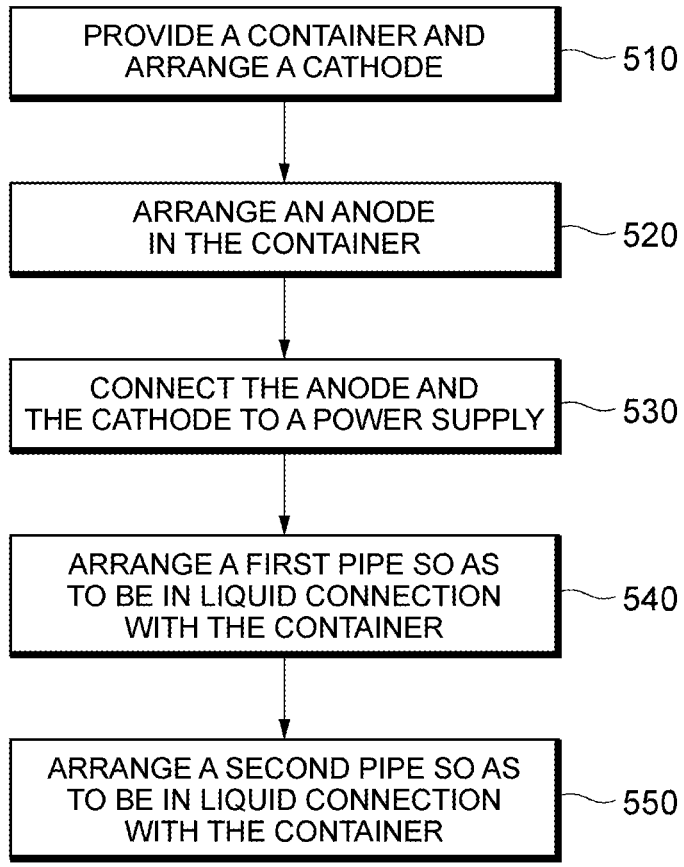
FIG. 5 is a flow chart showing an example of a method for manufacturing an electrolyzer device in accordance with the present disclosure.

FIG. 5 is a flow chart showing an example of a method for manufacturing the electrolyzer device 1 in accordance with the present disclosure. Referring to FIG. 5, in an operation 510, the container 3 to receive a solution such as the salt solution S may be provided on the support base 2. The container 3 may be configured to include a conductive portion being made of, but not limited to being made of, SUS at, at least, a side wall thereof. The side wall may correspond to the sidewall 31, which serves as the cathode, as discussed above. As another non-limiting example, a plate electrode may be arranged in a container made of an insulating material on a side wall thereof. In an operation 520, a conductive rod being made of, but not limited to being made of, graphite, may be arranged in the container 3 to extend in the vertical direction (i.e., the depth direction) of the container. As a further non-limiting example, the conductive rod may be positioned at substantially the center of the container 3 so as to be spaced away from the bottom of the container 3.

In an operation 530, the rod 4 may be operatively connected to a positive electrode of the DC power supply 5, whereas the sidewall 31 of the container 3 may be operatively connected to a negative electrode of the DC power supply 5. In an operation 540, the first pipe 6 having the intake port 61 may be arranged so as to be in liquid connection with the container 3. In this operation, the intake port 61 may be positioned in the vicinity of the side wall 31 of the container 3 relative to the rod 4. In an operation 550, the second pipe 7 may be arranged so as to be in liquid connection with the container 3.

Figure 6:
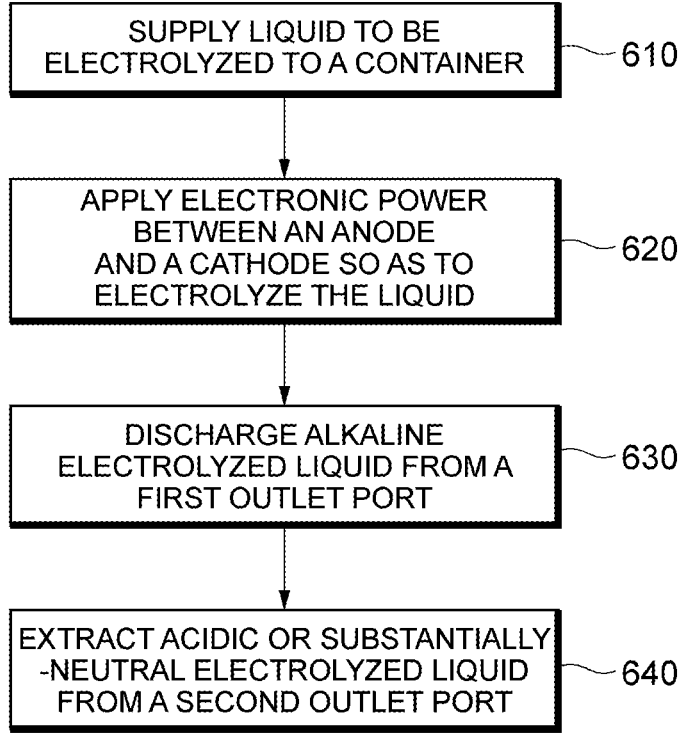
FIG. 6 is a flow chart showing an example of a method for producing electrolyzed liquid that is arranged for an electrolyzer device in accordance with the present disclosure.

FIG. 6 is a flow chart showing an example of a method for producing electrolyzed liquid that is arranged for the electrolyzer device 1 in accordance with the present disclosure. The method may be performed under control of the computing device 400 of the electrolyzer device 1.

Referring to FIG. 6, in an operation 610, the salt solution S may be supplied into the container 3 from the inlet port 36 so that the solution S can be in contact with the pair of electrodes 10 (i.e., the rod 4 and the sidewall 31).

When power (i.e., DC current) is applied to the pair of electrodes 10 by the DC power supply 5, in an operation 620, electrons may be provided therefrom, and thus the electrons may be interchanged between the ions in the salt solution S and the pair of electrodes 10 of the container 3. By this way, the following chemical reactions may occur so as to electrolyze the salt solution S.

(Reactions at the Anode)

$$H_2O \rightarrow \tfrac{1}{2}O_2 + 2H^+ + 2e^-$$

$$2Cl^- \rightarrow Cl_2 + 2e^-$$

$$Cl_2(aq) + H_2O \leftarrow \rightarrow HCl + HClO$$

As shown above, at the rod 4, water ($H_2O$) may be electrolyzed into hydrogen ions ($H^+$) and oxygen gas ($O_2$).

Further, chlorine gas ($Cl_2$) may be generated from chlorine ions ($Cl^-$). Furthermore, the chlorine gas ($Cl_2$) may be reacted with water ($H_2O$) to reversibly produce hydrochloric acid (HCl) and hypochlorous acid (HClO). Consequently, strongly acidic electrolyzed water (SAEW) may be produced. Note that, in the above formula, the symbol "←→" means that the reaction is reversible (the same shall apply hereinafter).

(Reactions at the Cathode)

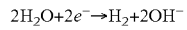

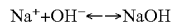

On the other hand, at the side wall 31 of the container 3, water ($H_2O$) may be electrolyzed to generate hydrogen gas ($H_2$) and hydroxide ions ($OH^-$). Further, sodium ions ($Na^+$) may react with the hydroxide ions ($OH^-$) to reversibly produce sodium hydroxide (NaOH). Consequently, strongly alkaline electrolyzed water may be produced.

As the above reactions proceed, the amount of strongly acidic electrolyzed water (SAEW) may gradually be increased around the rod 4, which may be arranged at substantially the center of the container 3. On the other hand, in an operation 630, the strongly alkaline electrolyzed water produced in the vicinity of the internal wall 34 of the container 3 may be introduced into the intake port 61 from an opening 61k thereof and discharged to the outside of the container 3 through the delivery pipe 62 when the on-off valve 63 is opened. In this way, the intake port 61 may also function as a first outlet port in the present disclosure. In an example, such discharged strongly alkaline electrolyzed water may be used for an intended purpose.

As a result of this, the strongly acidic electrolyzed water (SAEW) which may include hydrochloric acid (HCl) and hypochlorous acid (HClO)/hydrogen ions ($H^+$) may be diffused from the vicinity of the rod 4, so that the pH of electrolyzed water remaining in the container 3 may become more acidic. While, sodium hydroxide (NaOH)/hydroxide ions ($OH^-$) which may remain in the vicinity of the internal wall 34 of the container 3 and may be contained in the newly generated SAEW may be neutralized by hydrochloric acid (HCl) and hypochlorous acid (HClO)/hydrogen ions ($H^+$). Consequently, the electrolyzed water having a pH in the range from strongly acidic to neutral, i.e., electrolyzed water having a sterilizing action and a pH in the physiologically neutral range suitable for biological use may be generated and gradually increased in the container 3.

In an operation 640, the electrolyzed water having a pH in the range from strongly acidic to neutral may be introduced into the intake port 71 from an opening 71k thereof when the on-off valve 73 is opened. By way of this, such electrolyzed water may easily be extracted from the container 3 through the delivery pipe 72. In this way, the intake port 71 may also function as a second outlet port in the present disclosure.

Figure 7:
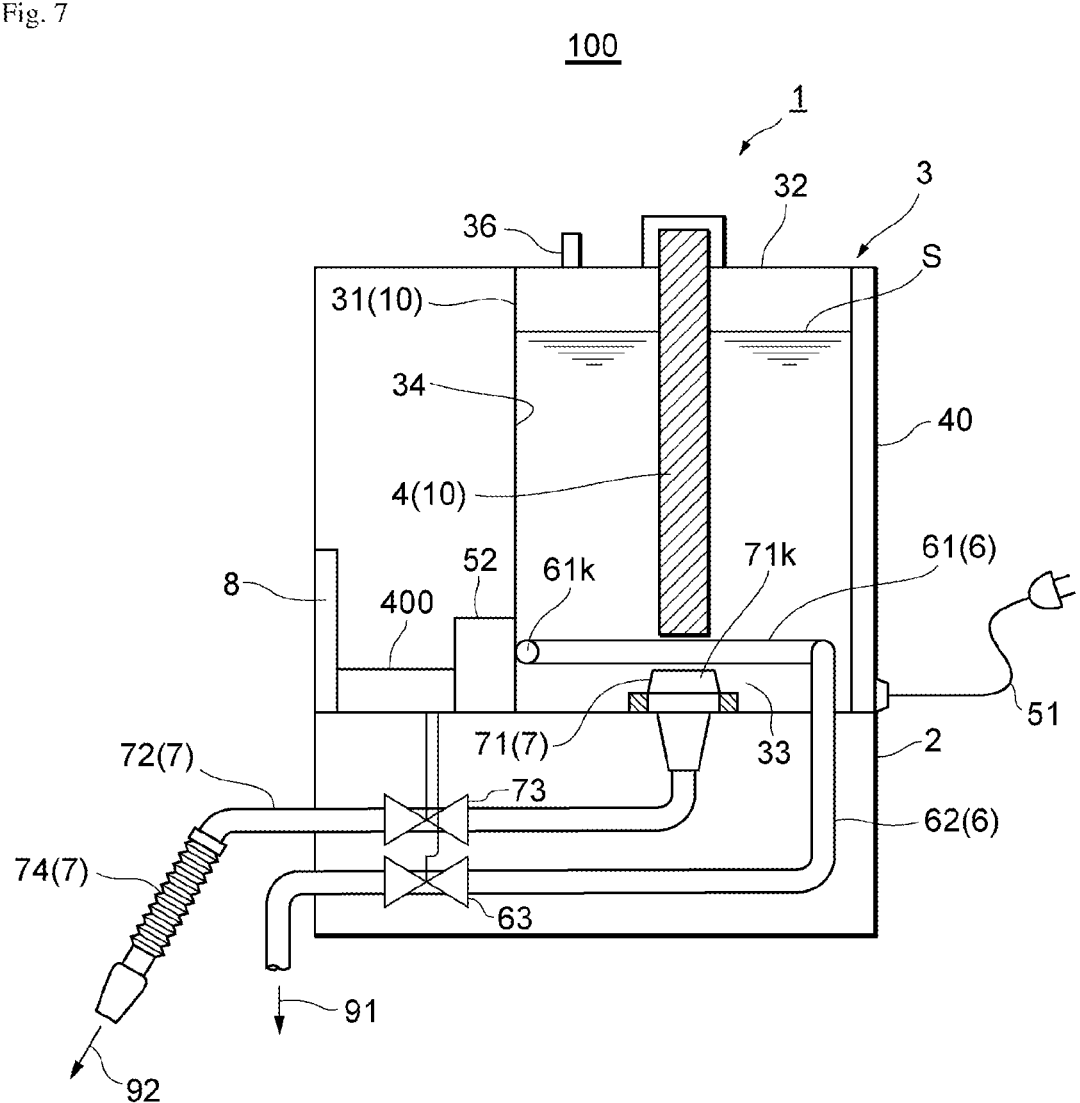
FIG. 7 is a schematic sectional view showing an example of a sterilizing liquid production device using an electrolyzer device arranged in accordance with the present disclosure.

FIG. 7 is a schematic sectional view showing an example of a sterilizing liquid production device using the electrolyzer device 1 arranged in accordance with the present disclosure. Referring to FIG. 7, a sterilizing liquid production device 100 may be configured to include the electrolyzer device 1. Specifically, the sterilizing liquid production device 100 may include a housing 40, which may determine to a large extent an exterior of the sterilizing liquid production device 100. The housing 40 may accommodate the container 3 of the electrolyzer device 1 therein. The housing 40 may also accommodate the computing device 400 therein. Alternatively, the computing device 400 may be an external device operatively connected to a communication interface provided in the electrolyzer device 1.

The sterilizing liquid production device 100 may also include a display device 8 of which a screen may be arranged at a portion of the housing 40. The sterilizing liquid production device 100 may be configured so that electric power can be supplied from an external, commercial source, and may thus include a cable 51 having a plug to be inserted into an electric outlet, and an AC-DC converter 52 to convert AC current from the commercial source into DC current for the sterilizing liquid production device 100. The delivery pipe 72 of the second pipe 7 may be connected to a joint pipe 74 which may have characteristics of flexibility.

The sterilizing liquid production device 100 as discussed above may electrolyze the salt solution S to produce the strongly acidic electrolyzed water (SAEW) 92. The produced SAEW 92 may be discharged to the outside through the second pipe 7, while the electrolyzed water having a sterilizing action and a pH in the physiologically neutral range suitable for biological use may be extracted.

As a result of the various configurations described in detail above, the present disclosure may include one or more of the following advantages, some of which have been discussed above. For example, according to the present disclosure, electrolyzed water, which may have a sterilizing effect and a pH in the physiologically neutral range suitable for biological use may easily and effectively be produced and obtained by a simple configuration of an electrolyzer device and a simple method using the same. Specifically, electrolyzed water, which may have a pH in the range between strong acidity and neutrality, may be easily obtained from a container of the electrolyzer device. Further, the electrolyzer device may allow the pH of the extracted acidic or substantially-neutral electrolyzed water to easily be selected by controlling an amount of the strongly alkaline electrolyzed water. Thus, the electrolyzer device may allow the produced electrolyzed water to be used effectively, thereby avoiding unnecessary disposal thereof.

More specifically, a configuration of a conventional electrolyzer device may be complex, as it may use a pair of parallel-plate electrodes and a diaphragm wall arranged between the electrodes. Further, such a conventional device may require complicated work to obtain the electrolyzed water within a physiologically neutral pH range.

Further, the electrolyzer device in the present disclosure may employ the sidewall of the container as the cathode, thereby allowing the configuration of the electrolyzer device 1 to be simplified even further. Moreover, a graphite rod can be employed as the anode, and the costs of the electrolyzer device may thereby be reduced.

Moreover, as the graphite rod may be arranged as the anode in the vicinity of a center of the container, the anode may be surrounded by the cathode at a constant distance, and thereby the strongly alkaline electrolyzed water may be obtained at the vicinity of the sidewall of the container.

Specifically, since an intake port may be arranged so as to extend along the sidewall of the container in the transverse section thereof, the strongly alkaline electrolyzed water can be discharged from the intake port. This may allow the pH of the electrolyzed water in the container 3 to be adjusted by discharging an amount of the strongly alkaline electrolyzed water.

As shown in the figures, an electrolyzer device can include: a container having a cylindrical shape with a cylindrical internal wall and being configured to receive liquid to be electrolyzed; an anode comprising a conductive rod positioned in the container and operatively coupled to a power supply; a cathode positioned on surfaces of an internal wall within the container so as to surround the anode, the cathode operatively coupled to the power supply; a first pipe in liquid connection with the container, the first pipe including a first intake port positioned in the vicinity of the cathode relative to the anode, the first intake port having a first opening directed along curvature of the cylindrical internal wall so as to be directed along the cathode; and a second pipe in liquid connection with the container, the second pipe including a second intake port positioned in the vicinity of the anode relative to the cathode, the second intake port having a second opening directed toward the anode, wherein at least one of the first pipe or second pipe extends into the container in order to position at least one of the first intake port or second intake port. Such extension of the first pipe into the container provides the first intake port to be positioned in the vicinity of the cathode relative to the anode so as to be closer to the cathode than anode, and such extension of the second pipe into the container provides the second intake port to be positioned in the vicinity of the anode relative to the cathode so as to be closer to the anode than cathode.

EXAMPLES

Using an experimental device, which implemented the electrolyzer device 1, a dilute salt solution S was electrolyzed. The values of the pH and available chlorine (AC) concentration of the electrolyzed water extracted from the first pipe 6 were measured, by changing the time in which power was applied to the pair of electrodes 10 (electrolysis time) and the amount of the strongly alkaline electrolyzed water discharged. It should be noted that a pH meter was used for measuring the pH and absorptiometry was used for measuring the AC concentration. Of the obtained measurement results, the levels of the discharged strongly alkaline electrolyzed water, pH and available chlorine (AC) concentration of the extracted electrolyzed water at 30 minutes after the start of the electrolysis are listed in TABLE 1.

TABLE 1

| Strong Alkaline Electrolyzed Water Discharged [cc] | pH of Electrolyzed Water Extracted [—] | AC Concentration [ppm] |
| --- | --- | --- |
| 50 | 5.6 | 13.0 |
| 70 | 5.5 | 11.1 |

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While the present disclosure has been described with respect to a limited number of embodiments, those skilled in the art, having the benefit of this disclosure, will appreciate that other embodiments can be devised which do not depart from the scope of the present disclosure as disclosed herein. Accordingly, the scope of the present disclosure should be limited only by the attached claims.

The invention claimed is:

1. An electrolyzer device comprising:
a container having a cylindrical shape with a cylindrical internal wall and being configured to receive liquid to be electrolyzed;
an anode comprising a conductive rod positioned in the container and operatively coupled to a power supply;
a cathode positioned on surfaces of an internal wall within the container so as to surround the anode, the cathode operatively coupled to the power supply;
a first pipe in liquid connection with the container, the first pipe including a first intake port positioned in the vicinity of the cathode relative to the anode, the first intake port having a first opening directed along curvature of the cylindrical internal wall so as to be directed along the cathode; and
a second pipe in liquid connection with the container, the second pipe including a second intake port positioned in the vicinity of the anode relative to the cathode, the second intake port having a second opening directed toward the anode,
wherein at least one of the first pipe or second pipe extends into the container in order to position at least one of the first intake port or second intake port.

2. The electrolyzer device according to claim 1, wherein at least a portion of the internal wall of the container is made of a conductive material which serves as the cathode.

3. The electrolyzer device according to claim 1, wherein the anode is formed from graphite and the cathode is formed from a metallic material.

4. The electrolyzer device according to claim 1, wherein a portion of the first pipe extending from the first opening of the first intake port is curved and extends along the curvature of the cylindrical internal wall of the container.

5. The electrolyzer device according to claim 1, wherein the first intake port of the first pipe is positioned at a bottom portion of the container and the anode is spaced apart from the bottom portion of the container.

6. The electrolyzer device according to claim 1, wherein the second pipe includes the second intake port positioned at a bottom portion of the container.

7. The electrolyzer device according to claim 1, further comprising an inlet port configured to supply the liquid to be electrolyzed to the container, the inlet port positioned at an upper portion of the container.

8. A sterilizing liquid production device comprising:
the electrolyzer device according to claim 1; and
a housing containing the electrolyzer device.

9. The electrolyzer device according to claim 1, wherein the conductive rod is positioned substantially in a center of the container such that opposing surfaces of the cathode and the anode are spaced apart from one another at a substantially constant distance.

10. The electrolyzer device according to claim 1, wherein:
a portion of the first pipe extending from the first opening of the first intake port is curved and extends along the curvature of the cylindrical internal wall of the container; and
the conductive rod is positioned substantially in a center of the container such that opposing surfaces of the cathode and the anode are spaced apart from one another at a substantially constant distance and the second opening is at the center of the container and directed toward the anode.

11. The electrolyzer device according to claim 10, comprising alkaline water in the first pipe and acidic water in the second pipe.

12. The electrolyzer device according to claim 10, wherein the curved portion of the first pipe is orthogonal with the conductive rod of the anode.

13. The electrolyzer device according to claim 10, wherein the first opening is directed horizontally and circumferentially with respect to the circumference of the cylindrical internal wall.

14. The electrolyzer device according to claim 1, wherein the first opening of the first intake port is orthogonal with the second opening of the second intake port.

15. The electrolyzer device according to claim 10, wherein the curved portion of the first pipe has a first portion that contacts the cylindrical internal wall and a second portion that is separated from the cylindrical internal wall.

16. The electrolyzer device according to claim 10, wherein the curved portion circumferentially extends halfway around the cylindrical internal wall.

17. The electrolyzer device according to claim 10, the first pipe including a straight portion extending downward from an end of the curved portion, the straight portion being opposite of the first opening.

18. The electrolyzer device according to claim 1, the container including a top cover and the conductive rod is attached to the top cover.

19. The electrolyzer device of claim 1, wherein:
strongly alkaline water is in the first pipe; and
strongly acidic water is in the second pipe.

20. The electrolyzer device of claim 1, wherein both the first pipe and second pipe extend into the container in order to position the first intake port and second intake port.

* * * * *

UNITED STATES PATENT AND TRADEMARK OFFICE
CERTIFICATE OF CORRECTION

PATENT NO.       : 9,487,875 B2
APPLICATION NO.  : 14/110743
DATED            : November 8, 2016
INVENTOR(S)      : Umimoto et al.

It is certified that error appears in the above-identified patent and that said Letters Patent is hereby corrected as shown below:

In the Specification

In Column 1, Line 7, delete "§371" and insert -- § 371 --, therefor.

In Column 9, Line 26, below "Examples", insert -- (Experimental Example 1) --.

Signed and Sealed this
Twenty-fifth Day of April, 2017

Michelle K. Lee
*Director of the United States Patent and Trademark Office*